(12) United States Patent
Widhopf et al.

(10) Patent No.: US 10,604,033 B2
(45) Date of Patent: Mar. 31, 2020

(54) BACKREST RELEASE SYSTEM

(71) Applicant: Lear Corporation, Southfield, MI (US)

(72) Inventors: Josef Widhopf, Oberding (DE); Uwe Hoyer, Oberding (DE); Ralph Schenker, Oberding (DE)

(73) Assignee: LEAR CORPORATION, Southfield, MI (US)

( * ) Notice: Subject to any disclaimer, the term of this patent is extended or adjusted under 35 U.S.C. 154(b) by 87 days.

(21) Appl. No.: 15/981,019

(22) Filed: May 16, 2018

(65) Prior Publication Data
US 2019/0023157 A1   Jan. 24, 2019

(30) Foreign Application Priority Data
Jul. 19, 2017 (DE) .......................... 10 2017 212 336

(51) Int. Cl.
*B60N 2/20* (2006.01)
*B60N 2/22* (2006.01)
*B60N 2/433* (2006.01)
*B60N 2/14* (2006.01)

(52) U.S. Cl.
CPC ................. *B60N 2/20* (2013.01); *B60N 2/22* (2013.01); *B60N 2/14* (2013.01); *B60N 2/203* (2013.01); *B60N 2/2245* (2013.01); *B60N 2/433* (2013.01)

(58) Field of Classification Search
CPC ........ B60N 2/2245; B60N 2/433; B60N 2/20; B60N 2/203; B60N 2/14; B60N 2/22
USPC .......................................... 297/378.11–38.13
See application file for complete search history.

(56) References Cited

U.S. PATENT DOCUMENTS

| 7,909,405 | B2 * | 3/2011 | Arima ...................... | B60N 2/20 297/378.12 |
| 8,282,150 | B2 * | 10/2012 | Clor ...................... | B60N 2/3011 296/65.09 |
| 8,393,682 | B2 * | 3/2013 | Hosoda .................. | B60N 2/366 292/216 |
| 8,439,443 | B2 * | 5/2013 | Nakane ................ | B60N 2/3013 297/341 |

(Continued)

FOREIGN PATENT DOCUMENTS

DE  10 2009 018 651 A1   10/2010
DE  10 2015 200 495 A1   7/2016

OTHER PUBLICATIONS

German Office Action dated Jul. 23, 2018, Application No. 10 2017 212 336.2, 7 Pages.

*Primary Examiner* — Syed A Islam
(74) *Attorney, Agent, or Firm* — Brooks Kushman P.C.

(57) ABSTRACT

A backrest release system is provided for a seat having a seat bottom, a pivotable backrest, and a releasable latch for locking the backrest relative to the seat bottom. The system comprises a first portion that is mountable to a support structure of the backrest. The first portion includes a carrier and a retainer that is attachable to the carrier so that the retainer is pivotable relative to the carrier. Furthermore, the retainer is connectable to the latch. The system also includes a second portion including a cover mountable on a back panel of the backrest, and a handle configured to be pivotally attached to the cover. The second portion is configured to be attached to the back panel prior to positioning the back panel on the backrest support structure, and the second portion is alignable with the first portion so that the handle may be attached to the retainer.

20 Claims, 4 Drawing Sheets

(56) References Cited

U.S. PATENT DOCUMENTS

| | | | |
|---|---|---|---|
| 8,459,731 B2* | 6/2013 | Runde | B60N 2/856 |
| | | | 297/61 |
| 8,496,294 B2 | 7/2013 | Holdampf et al. | |
| 8,556,348 B2 | 10/2013 | Glaser et al. | |
| 8,621,956 B2* | 1/2014 | Simeonidis | B60N 2/123 |
| | | | 297/378.13 |
| 8,690,251 B2 | 4/2014 | Miller et al. | |
| 8,777,315 B2* | 7/2014 | Lutzka | B60N 2/366 |
| | | | 296/65.17 |
| 8,985,692 B2 | 3/2015 | Pacolt | |
| 9,649,964 B2* | 5/2017 | Imajo | B60N 2/68 |
| 10,011,203 B2* | 7/2018 | Uehara | B60N 2/79 |
| 2002/0145313 A1* | 10/2002 | Alejandro | B60N 2/04 |
| | | | 297/183.1 |

\* cited by examiner

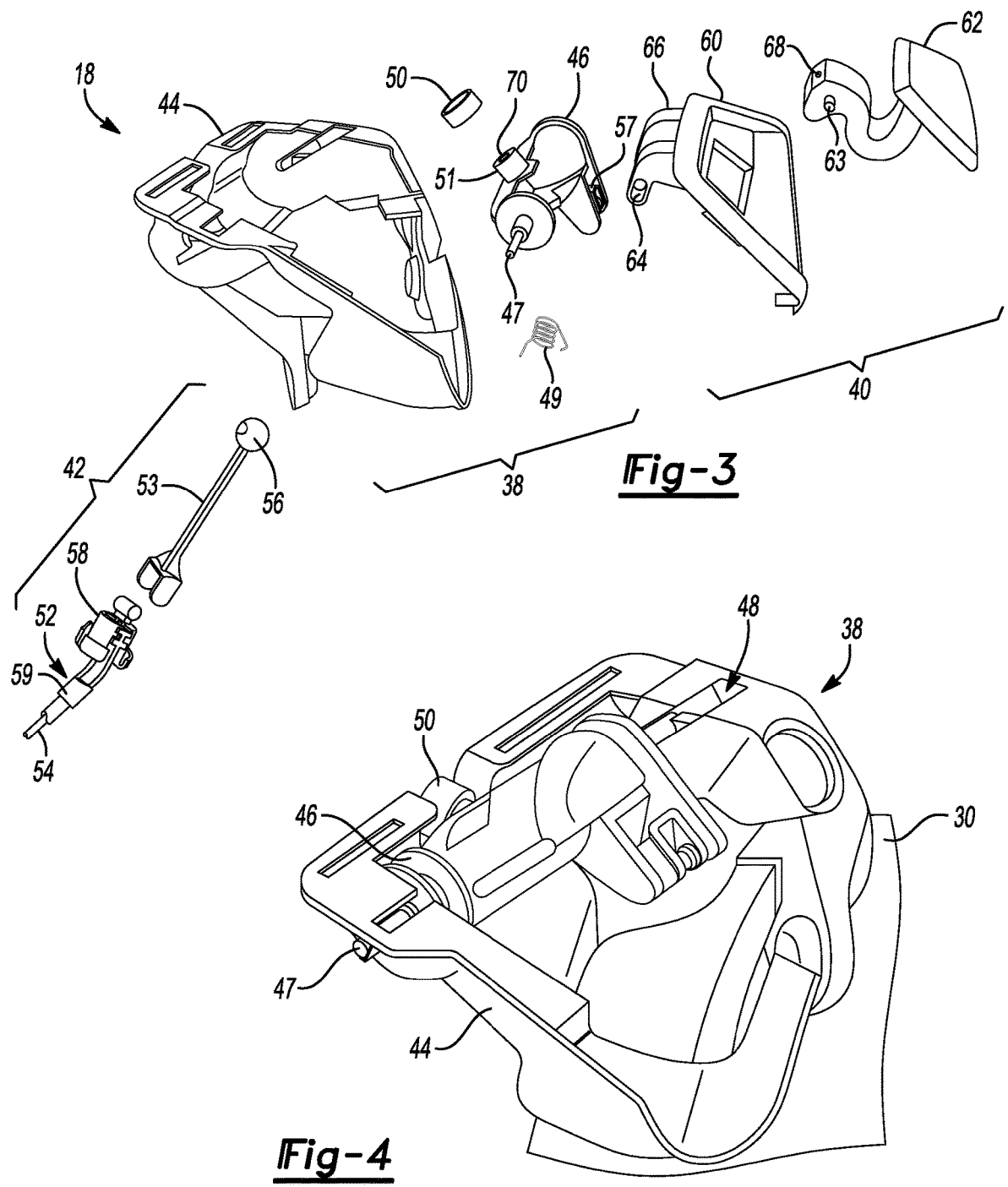

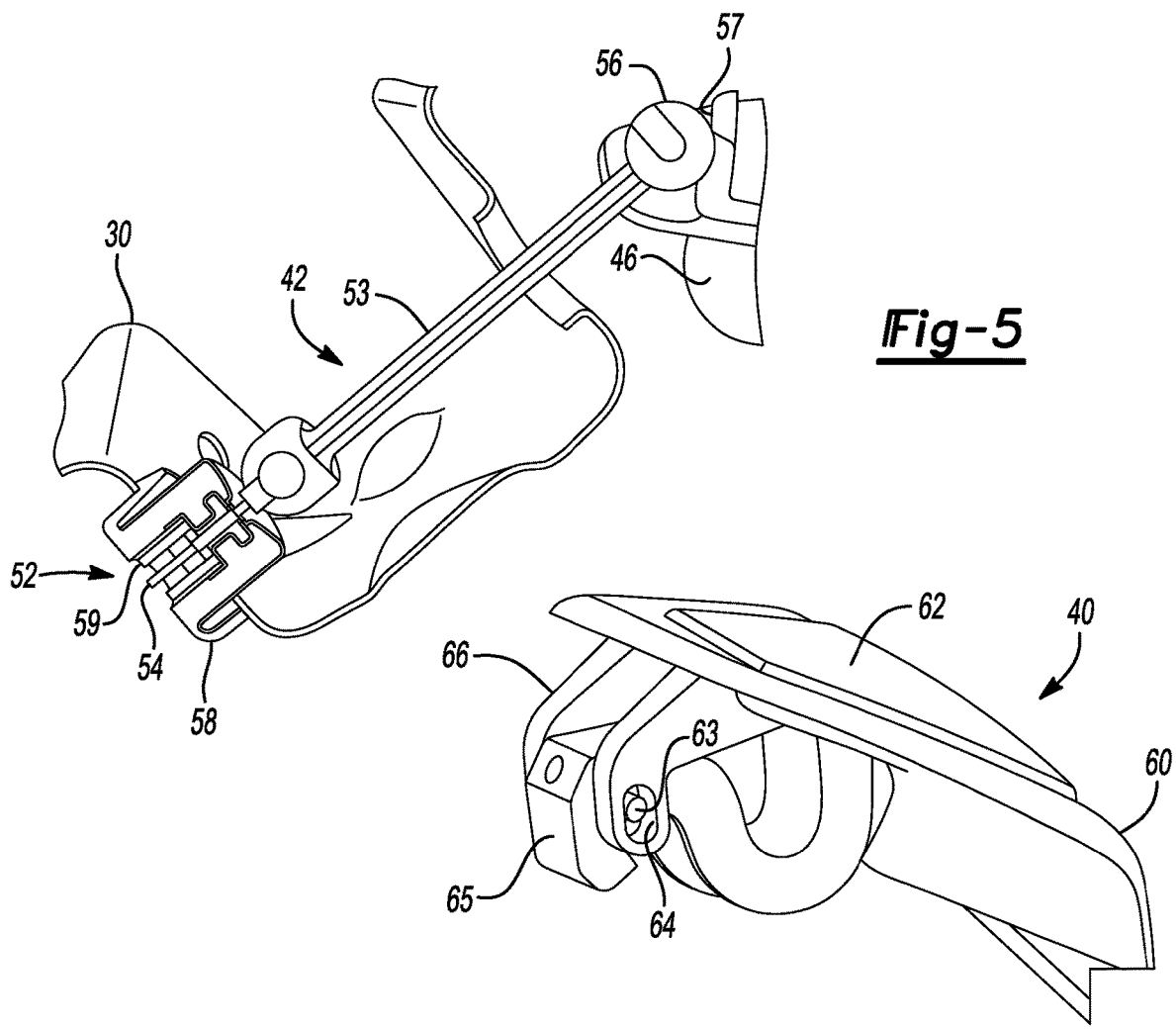
*Fig-5*
*Fig-6*
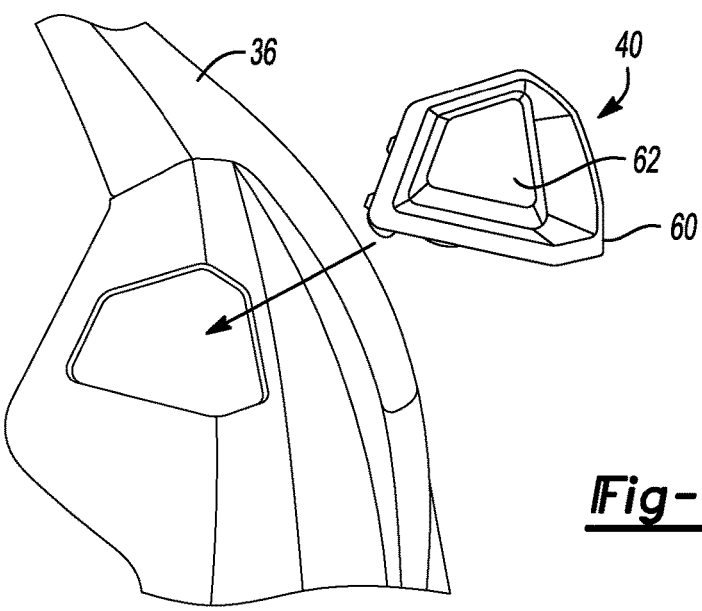
*Fig-7*

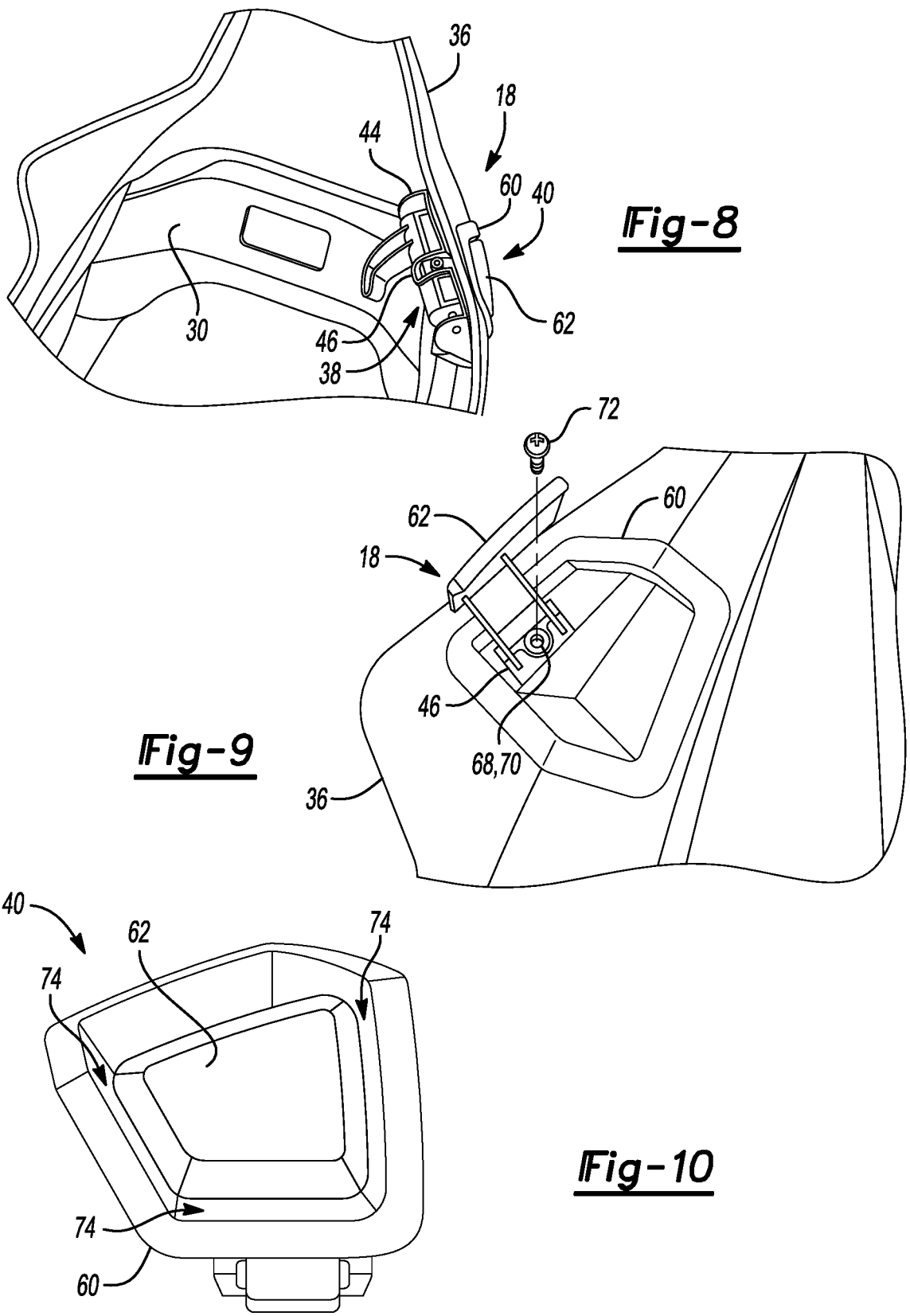

BACKREST RELEASE SYSTEM

CROSS-REFERENCE TO RELATED APPLICATIONS

This application claims foreign priority benefits under 35 U.S.C. § 119(a)-(d) to DE 10 2017 212 336.2, filed Jul. 19, 2017, the disclosure of which is hereby incorporated by reference in its entirety.

TECHNICAL FIELD

The present disclosure relates to the backrest release systems for vehicle seats.

BACKGROUND

A vehicle seat may be provided with a release system for releasing a latch or hinge mechanism. An example of such a system is disclosed in U.S. Pat. No. 8,556,348.

SUMMARY

A backrest release system, according to the disclosure, is provided for a vehicle seat having a seat bottom, a backrest that is pivotable relative to the seat bottom, and a releasable latch for locking the backrest with respect to the seat bottom. The backrest release system comprises a first portion that is mountable to a backrest support structure of the backrest. The first portion includes a carrier and a retainer that is attachable to the carrier so that the retainer is pivotable relative to the carrier. Furthermore, the retainer is connectable to the latch. In addition, the backrest release system includes a second portion including a cover that is mountable on a back panel of the backrest, and a handle configured to be pivotally attached to the cover. The second portion is configured to be attached to the back panel prior to positioning the back panel on the backrest support structure, and the second portion is alignable with the first portion when the back panel is positioned on the backrest support structure so that the handle of the second portion may be attached to the retainer of the first portion.

A vehicle seat according to the disclosure includes a seat bottom, a backrest pivotally attached to the seat bottom, and a releasable recliner mechanism configured to inhibit pivotal movement of the backrest with respect to the seat bottom when engaged, and to allow pivotal movement of the backrest with respect to the seat bottom when released. The backrest includes a support structure, a back panel for covering a rear portion of the support structure, and a backrest release system that is operable to release the recliner mechanism so that the backrest may pivot with respect to the seat bottom. The backrest release system includes a first portion mounted on the support structure, wherein the first portion includes a carrier, and a retainer attached to the carrier so that the retainer is pivotable relative to the carrier, and the retainer is further connected to the recliner mechanism. The backrest release system also includes a second portion including a cover mounted on the back panel, and a handle pivotally attached to the cover and fixedly attached to the retainer so that the handle and retainer are rotatable together.

A method, according to the disclosure, is also provided for assembling a backrest release system for a vehicle seat having a seat bottom, a seat back that is pivotable relative to the seat bottom, a releasable latch for locking the seat back with respect to the seat bottom, and a cable associated with the latch for releasing latch. The method comprises attaching a first portion of the backrest release system to a backrest support structure of the backrest, wherein the first portion includes a carrier and a retainer pivotally attached to the carrier; and attaching the retainer to the cable. The method further includes mounting a second portion of the backrest release system on a back panel of the backrest, wherein the second portion includes a cover and a handle pivotally attached to the cover. In addition, the method includes positioning the back panel proximate the backrest support structure; and attaching the handle of the second portion to the retainer of the first portion after positioning the back panel proximate the backrest support structure. According to the method, attaching the first portion of the backrest release system to the backrest support structure and mounting the second portion of the backrest release system on the back panel are performed before positioning the back panel proximate the backrest support structure.

BRIEF DESCRIPTION OF THE DRAWINGS

FIG. 3 is an exploded perspective view of the backrest release system;

FIG. 4 is a perspective view of a first portion of the backrest release system attached to the backrest support structure of the backrest;

FIG. 5 is a cross-sectional view of the first portion of the backrest release system attached to a Bowden cable assembly;

FIG. 6 is a perspective view of a second portion of the backrest release system;

FIG. 7 is a perspective view of the second portion of the backrest release system being mounted on a back panel of the backrest;

FIG. 8 is a perspective view of the back panel mounted on the backrest support structure, with the first and second portions of the backrest release system aligned with each other;

FIG. 9 is a rear perspective view of the back panel and backrest release system, with a handle of the backrest release system shown in a raised position to enable attachment of the first and second portions of the backrest release system; and FIG. 10 is a perspective view of the second portion of the backrest release system showing even gaps between edges of the handle and a cover of the second portion.

DETAILED DESCRIPTION

Figures 1, 2:
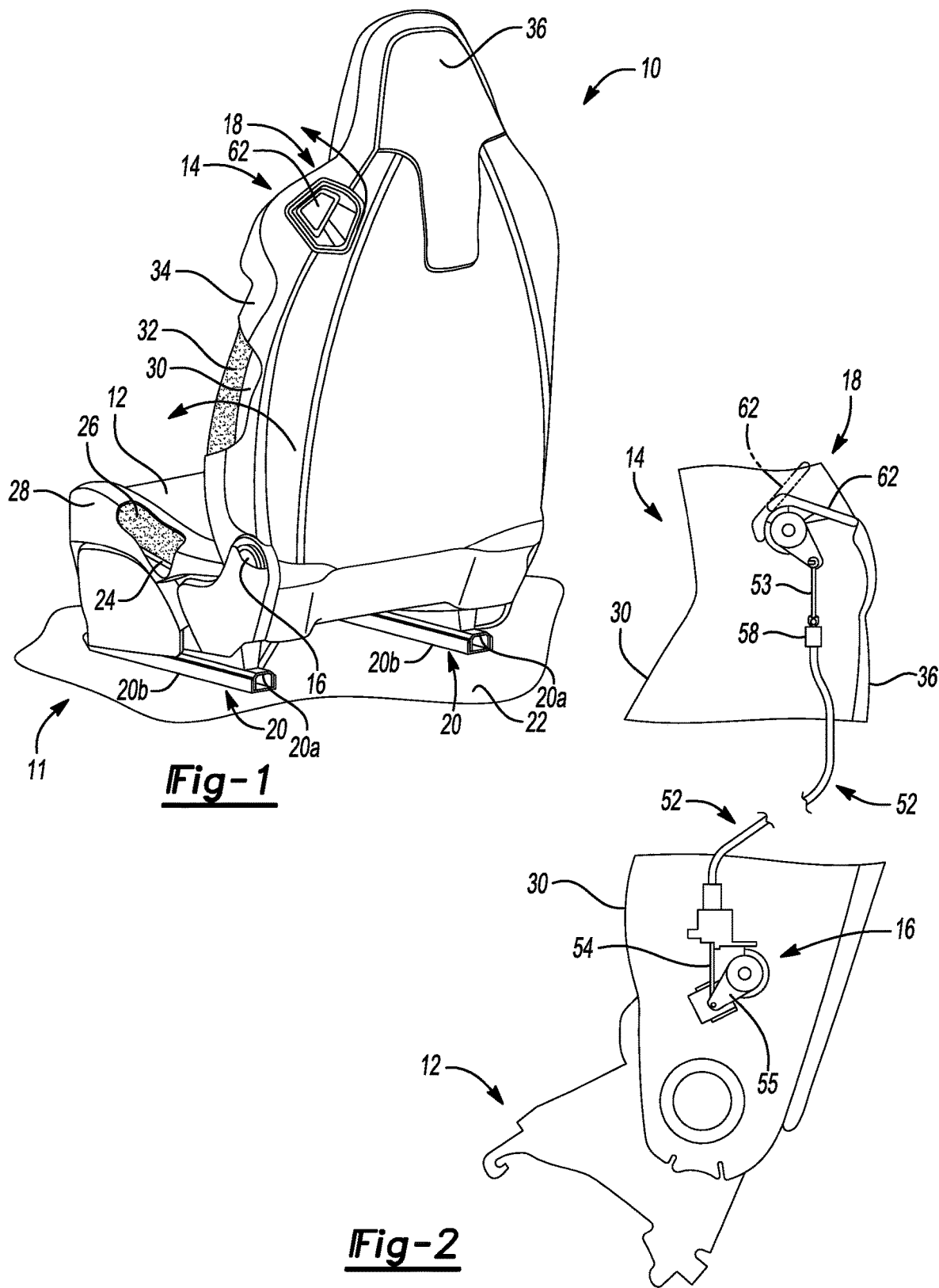
FIG. 1 is a rear perspective view of a vehicle seat including a seat bottom and a backrest having a backrest release system, according to the disclosure, for releasing a latch so that the backrest may pivot with respect to the seat bottom.
FIG. 2 is a schematic side view, partially in section, and with cushion members and trim covers removed to show further details of the seat.

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIG. 1 shows a vehicle seat assembly 10 mounted in a vehicle 11. The seat assembly 10 includes a seat bottom 12, a seat back or backrest 14 pivotally attached to the seat bottom 12, and a releasable latch 16, such as a recliner mechanism or hinge mechanism, that is configured to inhibit pivotal movement of the backrest 14 with respect to the seat bottom 12 when engaged. As explained below in more detail, the backrest 14 includes a backrest release module or system 18, according to the disclosure, that is operable to release the latch 16 so that the backrest 14 may pivot with respect to the seat bottom 12. For example, the backrest release system 18 may be used in an easy entry function in order to pivot the backrest 14 forwardly, while also sliding the entire seat assembly 10 forwardly.

In the embodiment shown in FIG. 1, the seat bottom 12 may be mounted on one or more seat tracks 20 so that the vehicle seat assembly 10 is movable forward and backward in the vehicle 11. For example, the seat bottom 12 may be fixedly attached to two upper tracks 20a that are slidably mounted on two lower tracks 20b, which may be fixedly mounted to a vehicle floor 22 or other portion of the vehicle 11. In addition, the seat bottom 12 may include suitable support structure 24, such as a seat bottom frame or seat pan, a cushion member 26, such as a foam cushion, supported by the support structure 24, and a trim cover 28 that covers the cushion member 26 and a portion or all of the support structure 24.

Referring to FIGS. 1 and 2, the backrest 14 includes a suitable backrest support structure 30, such as a seat back frame or backrest frame; a cushion member 32, such as a foam cushion, supported by the backrest support structure 30; a trim cover 34 that covers the cushion member 32; and a back panel 36 for covering a rear portion of the backrest support structure 30. The backrest release system 18 is mounted on the backrest support structure 30 and the back panel 36, and is attached to the releasable latch 16 so that the backrest release system 18 may be operated to release the latch 16.

Referring to FIG. 3, the backrest release system 18 includes a first portion 38, such as a lower portion or part, that is configured to be attached to the backrest support structure 30, and a second portion 40, such as an upper portion or part, that is configured to be mounted onto the back panel 36. The backrest release system 18 further includes an attachment arrangement 42 for connecting the first portion 38 to the latch 16.

Referring to FIGS. 3 and 4, the first portion 38 includes a support member or body, such as a carrier 44, that is fixedly attachable to the support structure 30 with suitable fasteners, such as screws or rivets, and a rotatable member or body, such as a retainer 46, that is attachable to the carrier 44 so that the retainer 46 is rotatable relative to the carrier 44. For example, the retainer 46 may be pivotally attached to the carrier 44 with one or more connecting rods 47 that are each received in an opening or slot 48 of the carrier 44 so that the retainer 46 is radially fixed with respect to the carrier 44, while being axially movable with respect to the carrier 44. For example, each slot 48 may have a guide section for guiding a respective connecting rod 47 to a receptacle section of the slot that is configured to receive the connecting rod 47 so that the connecting rod 47 can rotate but not move radially. The retainer 46 may also be configured such that it's lateral sides are spaced away from the carrier 44 when the connecting rods 47 are received in the slots 48 so that the retainer 46 may move axially with respect to the carrier 44. A spring 49 may also be connected between the retainer 46 and the carrier 44 for urging the retainer 46 toward a home position, shown in FIG. 2. In addition, referring to FIGS. 3 and 4, the first portion 38 may include a bumper 50 that is positioned on a post or projection 51 of the retainer 46, and the bumper 50 may be engageable with the carrier 44 when the retainer 46 is in a raised or fully rotated position shown in FIG. 4. Furthermore, assembly of the retainer 46 to the carrier 44, as well as assembly of the other components of the first portion 38, may occur prior to attaching the carrier 44 to the support structure 30.

Referring to FIGS. 2, 3 and 5, the retainer 46 may be attached to the latch 16 with the attachment arrangement 42. For example, the attachment arrangement 42 may include a cable, such as a Bowden cable assembly or Bowden cable 52, and a connector member, such as a drawbar 53. One end of an inner cable 54 of the Bowden cable 52 may be attached to the retainer 46 via the drawbar 53 so that the inner cable 54 is movable with the retainer 46, and an opposite end of inner cable 54 of the Bowden cable 52 may be attached to a release lever 55 of the latch 16 (shown in FIG. 2). For example, the drawbar 53 may have an enlarged head 56 that is configured to be received in an opening 57 of the retainer 46 in order to attach the drawbar 53 to the retainer 46. As also shown in FIG. 5, the attachment arrangement 42 may include a bearing 58 that is configured to be attached to an outer sleeve 59 of the Bowden cable 52 and the support structure 30. As another example, the inner cable 54 of the Bowden cable 52 may be connected directly to the retainer 46. As yet another example, the retainer 46 may be connected to the latch 16 using any suitable device or member, such as a link.

Referring to FIGS. 3, 6 and 7, the second portion 40 of the backrest release system 18 includes a cover 60 that is mountable on the back panel 36, and a handle 62 that is configured to be pivotally attached to the cover 60. For example, the handle 62 may include one or more integral pivot rods 63 that are each configured to be snap fit into an elongated slot 64 formed in the cover 60. In the illustrated embodiment, the handle 62 includes an end portion 65 on which two rods 63 are formed, and the end portion 65 is configured to fit between two arms 66 of the cover 60 with little or no axial play between the end portion 65 and the arms 66. With such a configuration, the handle 62 may be pivotally attached to the cover 60 so that the handle 62 is axially fixed with respect to the cover 60, while being radially (e.g., vertically) movable with respect to the cover 60.

Assembly of the handle 62 to the cover 60 may occur prior to mounting the cover 60 on the back panel 36. Furthermore, the cover 60 may be mounted to the back panel 36 in any suitable manner. For example, the cover 60 may be inserted into an opening in the back panel 36, and a periphery of the cover 60 may be adhesively attached to the back panel 36.

The first and second portions 38 and 40, respectively, of the backrest release system 18 may be attached together in any suitable manner. Referring to FIGS. 8 and 9, for example, after the second portion 40 has been attached to the back panel 36, the back panel 36 may be assembled onto the support structure 30, or otherwise positioned proximate the support structure 30, so that the portions 38 and 40 are positioned proximate each other. The handle 62 may then be properly aligned with the retainer 46 so that a connection opening 68 of the handle 62 is aligned with a connection opening 70 of the retainer 46. Next, a fastener, such as a screw 72, may be inserted into the aligned openings 68, 70 of the handle 62 and the retainer 46 to connect the handle 62 to the retainer 46, as shown in FIG. 9, so that the handle 62 is rotatable with the retainer 46. Referring to 8, the back panel 36 extends between, or is positioned between, the cover 60 and the carrier 44 when the handle 62 is attached to the retainer 46.

Referring to FIG. 10, with the configuration of the backrest release system 18, even gaps 74 may be provided between edges of the handle 62 and the cover 60 of the second portion 40. For example, as mentioned above, the handle 62 may be connected to the cover 60 so that the handle 62 is axially fixed with respect to the cover 60 (i.e., axial play between the handle 62 and the cover 60 is inhibited), but with radial (e.g., vertical) play or movability between the handle 62 and the cover 60. As result, close tolerances may be maintained between the edges of the handle 62 and the cover 60.

Furthermore, as also mentioned above, the retainer 46 of the first portion 38 may be connected to the carrier 44 so that the retainer 46 is radially fixed with respect to the carrier 44 (i.e., radial play between the retainer 46 and the carrier 44 is inhibited), but with axial play or movability between the retainer 46 and the carrier 44. With such a configuration, the handle 62 may be adjusted or moved radially (e.g., vertically) with respect to the cover 60 and the retainer 46, and the retainer 46 may be adjusted or moved axially with respect to the carrier 44 and the handle 62, in order to align the connection openings 68 and 70 of the handle 62 and retainer 46, respectively, so that the screw 72 may be inserted into the connection openings, but without affecting gaps between the handle 62 and the cover 60.

The configuration of the backrest release system 18 also enables efficient assembly of the backrest release system 18. For example, as mentioned above, the first portion 38 of the backrest release system may be preassembled, and then the first portion 38 may be attached to the backrest support structure 30. The second portion 40 of the backrest release system 18 may also be preassembled, and then the second portion 40 may be attached to the back panel 36. Next, the back panel 36 having the second portion 40 mounted thereon may be positioned proximate the backrest support structure 30 so that the portions 38 and 40 may be aligned with each other. The portions 38 and 40 may be joined together, such as with the screw 72.

With the above configuration, assembly of the backrest release system 18 and other components of the seat assembly 10 may occur at different locations or plants. For example, preassembly of the portions 38 and 40 may occur at the same or different locations, and then the first portion 38 may be provided to a backrest structure supplier, and the second portion 40 may be provided to a back panel supplier. The backrest structure supplier may then attach the first portion 38 to the backrest support structure 30, and the back panel supplier may attach the second portion 40 to the back panel 36. Next, the backrest support structure 30 and the back panel 36 may be provided to a seat assembly manufacturing plant, where the back panel 36 may be mounted onto the backrest support structure 30 and the portions 38 and 40 of the backrest release system 18 may be attached together.

Returning to FIG. 2, operation of the backrest release system 18 will now be briefly described. When a seat operator desires to pivot the backrest 14 toward the seat bottom 12, the operator may pivot the handle 62 upwardly from the home position (shown in solid lines in FIG. 2) to the raised position (shown in phantom lines in FIG. 2), in order to rotate the retainer 46 from its home position to its raised position. As a result, the retainer 46 will move the drawbar 53 upwardly so that the drawbar 53 pulls on the inner cable 54 of the Bowden cable 52. The inner cable 54 will in turn cause the release lever 55 to rotate (clockwise in FIG. 2) so that the release lever 55 releases the latch 16. The operator may then move the backrest 14 forwardly and/or a spring (not shown) may urge the backrest 14 forwardly. Operation of the backrest release system 18 may also cause latches of the seat tracks 20 to be released, so that the seat assembly 10 may be slid forwardly.

It should be noted that the latch 16 may be any suitable latch mechanism configured to lock the backrest 14 with respect to the seat bottom 12 in one or more positions when locked or engaged, and to allow the backrest 14 to pivot with respect to the seat bottom 12 when released (e.g., unlocked or disengaged). For example, the latch 16 may comprise a continuous or discontinuous recliner mechanism having one or more pawls, or a recliner mechanism having a sector gear and an engagement member that is movable to engage and disengage the sector gear.

Furthermore, the backrest release system 18 may be used to release multiple latches 16 (e.g., recliner mechanisms on opposite sides of the vehicle seat 10). For example, the Bowden cable assembly 52 may include two inner cables 54 that are connected to a common end fitting, which is connected to the drawbar 53, and each inner cable 54 may be connected to a respective release lever 55 of a respective latch 16. In that regard, the Bowden cable assembly 52 may include a suitable splitter that allows the inner cables 54 to extend to the different release levers 55. With such a configuration, pivoting of the handle 62 to the raised position may cause each release lever 55 to rotate and release the corresponding latch 16.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A backrest release system for a vehicle seat having a seat bottom, a backrest that is pivotable relative to the seat bottom, and a releasable latch for locking the backrest with respect to the seat bottom, the backrest including a backrest support structure and a back panel, the backrest release system comprising:

a first portion that is mountable to the backrest support structure, the first portion including a carrier, and a retainer that is attachable to the carrier so that the retainer is pivotable relative to the carrier, the retainer further being connectable to the latch; and a second portion including a cover that is mountable on the back panel, and a handle configured to be pivotally attached to the cover;

wherein the second portion is configured to be attached to the back panel prior to positioning the back panel on the backrest support structure, and wherein the second portion is alignable with the first portion when the back panel is positioned on the backrest support structure so that the handle of the second portion may be attached to the retainer of the first portion.

2. The backrest release system of claim 1 wherein the carrier is configured to be connected directly to the backrest support structure.

3. The backrest release system of claim 1 wherein the retainer is configured to be attached to the carrier with a connecting rod so that radial play of the retainer relative to the carrier is inhibited, while enabling axial movement of the retainer with respect to the carrier when the handle is not attached to the retainer.

4. The backrest release system of claim 3 wherein the handle is configured to be connected to the cover so that axial play of the handle with respect to the cover is inhibited, while enabling radial movement of the handle with respect to the cover when the handle is not attached to the retainer.

5. The backrest release system of claim 4 wherein the cover includes an elongated slot that is configured to receive a pivot rod of the handle so that the pivot rod is radially slidable in the slot when the handle is not attached to the retainer.

6. The backrest release system of claim 1 wherein the seat further includes a cable associated with the latch for releasing the latch, and wherein the retainer is connectable to the cable.

7. The backrest release system of claim 1 wherein the handle is configured to be connected to the cover so that the handle is axially fixed with respect to the cover, while being radially movable with respect to the cover when the handle is not attached to the retainer.

8. The backrest release system of claim 1 wherein the handle is configured to be attached to the retainer with a fastener when the handle is in a raised position.

9. The backrest release system of claim 8 wherein the handle and the retainer each define an opening, and the openings are alignable for receiving the fastener when the back panel is positioned on the backrest support structure.

10. The backrest release system of claim 1 wherein the first and second portions are configured so that the back panel is positioned between the cover and the carrier when the handle is attached to the retainer.

11. A vehicle seat comprising:
   a seat bottom;
   a backrest pivotally attached to the seat bottom; and
   a releasable recliner mechanism configured to inhibit pivotal movement of the backrest with respect to the seat bottom when engaged, and to allow pivotal movement of the backrest with respect to the seat bottom when released;
   wherein the backrest includes a support structure, a back panel for covering a rear portion of the support structure, and a backrest release system that is operable to release the recliner mechanism so that the backrest may pivot with respect to the seat bottom, the backrest release system including:
      a first portion mounted on the support structure, the first portion including a carrier, and a retainer attached to the carrier so that the retainer is pivotable relative to the carrier, the retainer further being connected to the recliner mechanism; and
      a second portion including a cover mounted on the back panel, and a handle pivotally attached to the cover and fixedly attached to the retainer so that the handle and retainer are rotatable together.

12. The vehicle seat of claim 11 wherein the second portion is configured to be mounted on the back panel prior to positioning the back panel on the support structure.

13. The vehicle seat of claim 11 further comprising a cable connected to the recliner mechanism and the retainer.

14. A method of assembling a backrest release system for a vehicle seat having a seat bottom, a seat back that is pivotable relative to the seat bottom, a releasable latch for locking the seat back with respect to the seat bottom, and a cable associated with the latch for releasing latch, the seat back including a backrest support structure and a back panel, the method comprising:
   attaching a first portion of the backrest release system to the backrest support structure, the first portion including a carrier, and a retainer pivotally attached to the carrier;
   attaching the retainer to the cable;
   mounting a second portion of the backrest release system on the back panel, the second portion including a cover and a handle pivotally attached to the cover;
   positioning the back panel proximate the backrest support structure; and
   attaching the handle of the second portion to the retainer of the first portion after positioning the back panel proximate the backrest support structure;
   wherein attaching the first portion of the backrest release system to the backrest support structure and mounting the second portion of the backrest release system on the back panel are performed before positioning the back panel proximate the backrest support structure.

15. The method of claim 14 wherein the backrest release system is configured so that the second portion is alignable with the first portion when the back panel is positioned proximate the backrest support structure, and wherein attaching the handle of the second portion to the retainer of the first portion comprises attaching the handle to the retainer with a fastener when the handle is in a raised position.

16. The method of claim 15 wherein the handle and the retainer each define an opening, and the openings are alignable for receiving the fastener.

17. The method of claim 14 wherein attaching the first portion of the backrest release system to the backrest support structure comprises attaching the carrier to the backrest support structure and attaching the retainer to the carrier with a connecting rod so that the retainer is radially fixed with respect to the carrier, while being axially movable with respect to the carrier prior to attaching the handle of the second portion to the retainer.

18. The method of claim 17 wherein mounting the second portion of the backrest release system on the back panel comprises attaching the cover directly to the back panel, and connecting the handle to the cover so that the handle is axially fixed with respect to the cover, while being radially movable with respect to the cover prior to attaching the handle to the retainer.

19. The method of claim 18 wherein the handle is connected to the cover prior to attaching the cover to the back panel.

20. The method of claim 19 further comprising aligning the handle with the retainer prior to attaching the handle to the retainer, and wherein the aligning comprises moving the retainer axially with respect to the carrier or moving the handle radially with respect to the cover.

* * * * *